(12) United States Patent
Chang

(10) Patent No.: US 7,581,679 B2
(45) Date of Patent: *Sep. 1, 2009

(54) DUAL LIGHT SOURCE VOLTAGE-MODULATED RECIPROCAL CONTROL CIRCUIT FOR SCANNER

(76) Inventor: Chin-Lin Chang, 3F, No. 3, 37 Alley, 152 Lane, 2 Sec., Chung-Hsing Rd., Chulung Chen, Hsinchu Hsien (TW)

( * ) Notice: Subject to any disclaimer, the term of this patent is extended or adjusted under 35 U.S.C. 154(b) by 247 days.

This patent is subject to a terminal disclaimer.

(21) Appl. No.: 11/446,178

(22) Filed: Jun. 1, 2006

(65) Prior Publication Data

US 2007/0040031 A1    Feb. 22, 2007

Related U.S. Application Data

(63) Continuation of application No. 09/997,647, filed on Nov. 27, 2001, now Pat. No. 7,070,102.

(51) Int. Cl.
*G06K 7/10* (2006.01)
*G02B 26/12* (2006.01)

(52) U.S. Cl. .................. 235/454; 359/201

(58) Field of Classification Search .......... 235/454; 359/201, 204; 358/487
See application file for complete search history.

(56) References Cited

U.S. PATENT DOCUMENTS

| 4,504,951 | A  |   | 3/1985 | McMahan et al. |
|-----------|-----|---|--------|----------------|
| 5,144,117 | A  |   | 9/1992 | Hasegawa et al. |
| 6,054,707 | A  | * | 4/2000 | Hou .......................... 250/234 |
| 6,362,912 | B1 | * | 3/2002 | Lewis et al. ................. 359/204 |
| 6,433,907 | B1 | * | 8/2002 | Lippert et al. ............... 359/201 |
| 7,070,102 | B2 | * | 7/2006 | Chang ........................ 235/454 |
| 2001/0012134 | A1 | * | 8/2001 | Han .......................... 358/487 |

* cited by examiner

*Primary Examiner*—Daniel A Hess
(74) *Attorney, Agent, or Firm*—Stolowitz Ford Cowger LLP (57) ABSTRACT

A dual light source voltage-modulated reciprocal control circuit for a scanner. The circuit includes a voltage modulation circuit, a first lamp driving circuit, a second lamp driving circuit and a reciprocal control circuit. The voltage-modulating circuit generates a modulated voltage whose magnitude can be adjusted through pulse width modulation of a square wave. The first lamp driving circuit receives the modulated voltage to drive a first lamp. Similarly, the second lamp driving circuit receives the modulated voltage to drive a second lamp. The reciprocal control circuit redirects the modulated voltage to the first lamp driving circuit or the second lamp driving circuit according to the dictate of a reciprocal logic signal.

17 Claims, 6 Drawing Sheets

Table 1

| F/U LAMP | square SV | back lamp | cover lamp |
|---|---|---|---|
| HIGH | PULSE/HIGH | ON | OFF |
| LOW | PULSE/HIGH | OFF | ON |
| X | LOW | OFF | OFF |

DUAL LIGHT SOURCE VOLTAGE-MODULATED RECIPROCAL CONTROL CIRCUIT FOR SCANNER

CROSS-REFERENCE TO RELATED APPLICATIONS

The present application is a continuation of U.S. application Ser. No. 09/997,647, filed Nov. 27, 2001, now U.S. Pat. No. 7,070,102 titled "Dual Light Source Voltage-Modulated Reciprocal Control Circuit for Scanner", inventor Chin-Lin Chang.

BACKGROUND OF THE INVENTION

1. Field of Invention

The present invention relates to a dual light source voltage modulated reciprocal control circuit. More particularly, the present invention relates to a dual light source voltage-modulated reciprocal control circuit for a scanner.

2. Description of Related Art

A scanner requires a light source to conduct a document scanning. In general, a scanner has two sets of lights for document scanning, namely, a set of back lights for scanning of ordinary opaque documents and a set of cover lights for scanning transparent documents.

Figure 1:
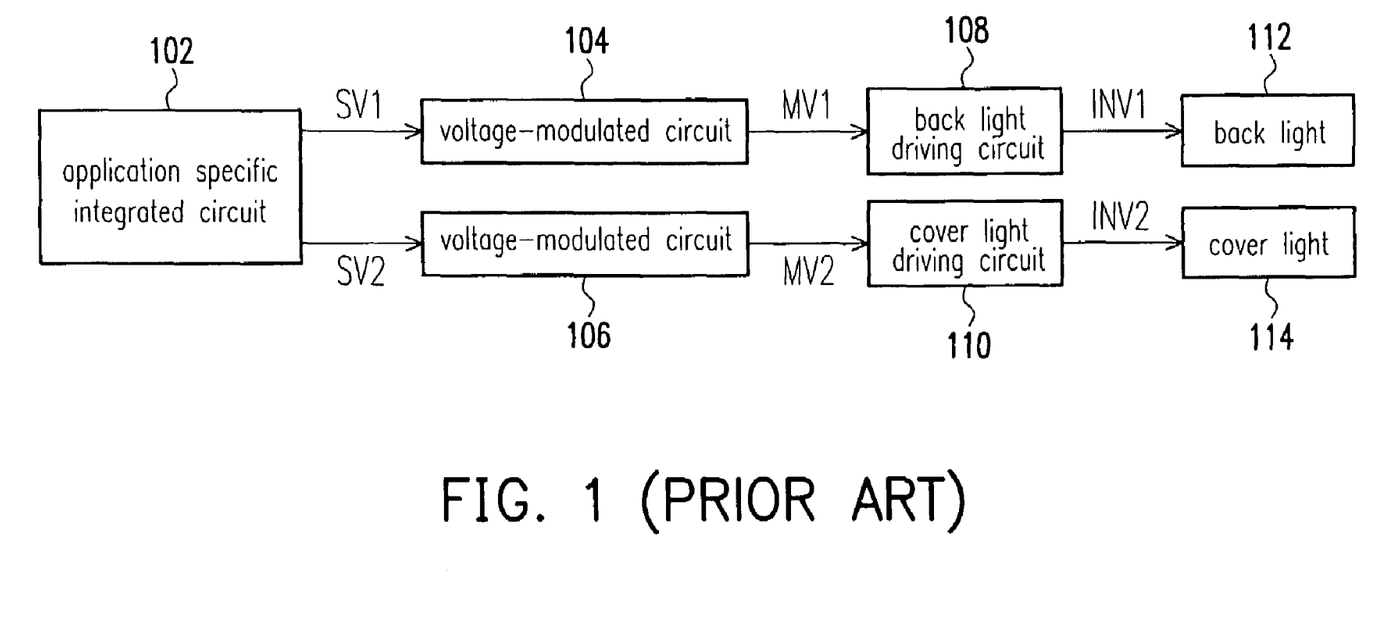
FIG. 1 is a block diagram showing a dual light source circuit in a conventional scanner.

FIG. 1 is a block diagram showing a dual light source circuit in a conventional scanner. As shown in FIG. 1, square wave signals SV1 and SV2 are transmitted from an application specific integrated circuit 102 to a first voltage-modulated circuit 104 and a second voltage-modulated circuit 106 respectively. Pulse width of the square wave signals SV1 and SV2 can be modulated (for example, within the range 15%~80%). The larger the pulse width of the square wave signals SV1 and SV2, the greater will be the magnitude of the modulated voltages MV1 and MV2 each having a direct current (dc) square wave profile submitted from the first voltage-modulated circuit 104 and the second voltage-modulated circuit 106.

The first voltage-modulated circuit 104 and the second voltage-modulated circuit 106 submit the modulated voltages MV1 and MV2 to a back light driving circuit 108 and a cover light driving circuit 110 respectively. The back light driving circuit 108 and the cover light driving circuit 110 are dc-to-ac inverters capable of converting a direct current (dc) voltage into an alternating (ac) voltage. The back light driving circuit 108 issues an alternating voltage INV1 to a back light 112 and the cover light driving circuit 110 issue an alternating voltage source INV2 to a cover light 114. Hence, either the back light 112 or the cover light 114 is triggered to conduct a document scanning but not both.

However, most conventional scanners having a dual light source circuit employ two sets of voltage-modulating circuits. With the deployment of two voltage-modulating circuits, more area on a printed circuit board is required to house component devices. Ultimately, a greater hardware cost is incurred.

SUMMARY OF THE INVENTION

Accordingly, one object of the present invention is to provide a dual light source voltage-modulated reciprocal control circuit for a scanner that uses just one set of voltage-modulating circuit. With less component devices, area occupation of the control circuit on a printed circuit board is reduced and some hardware cost is saved.

To achieve these and other advantages and in accordance with the purpose of the invention, as embodied and broadly described herein, the invention provides a dual light source voltage-modulated reciprocal control circuit for a scanner. The circuit includes a voltage-modulating circuit, a first lamp driving circuit, a second lamp driving circuit and a reciprocal control circuit. The voltage-modulating circuit generates a modulated voltage whose magnitude can be adjusted through pulse width modulation of a square wave. The first lamp driving circuit receives the modulated voltage to drive a first lamp. Similarly, the second lamp driving circuit receives the modulated voltage to drive a second lamp. The reciprocal control circuit redirects the modulated voltage to the first lamp driving circuit or the second lamp driving circuit according to the dictate of a reciprocal logic signal. With such a circuit design, hardware cost for the circuit is reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

Table 1 shows the logic behind the switching of the light sources according to this invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
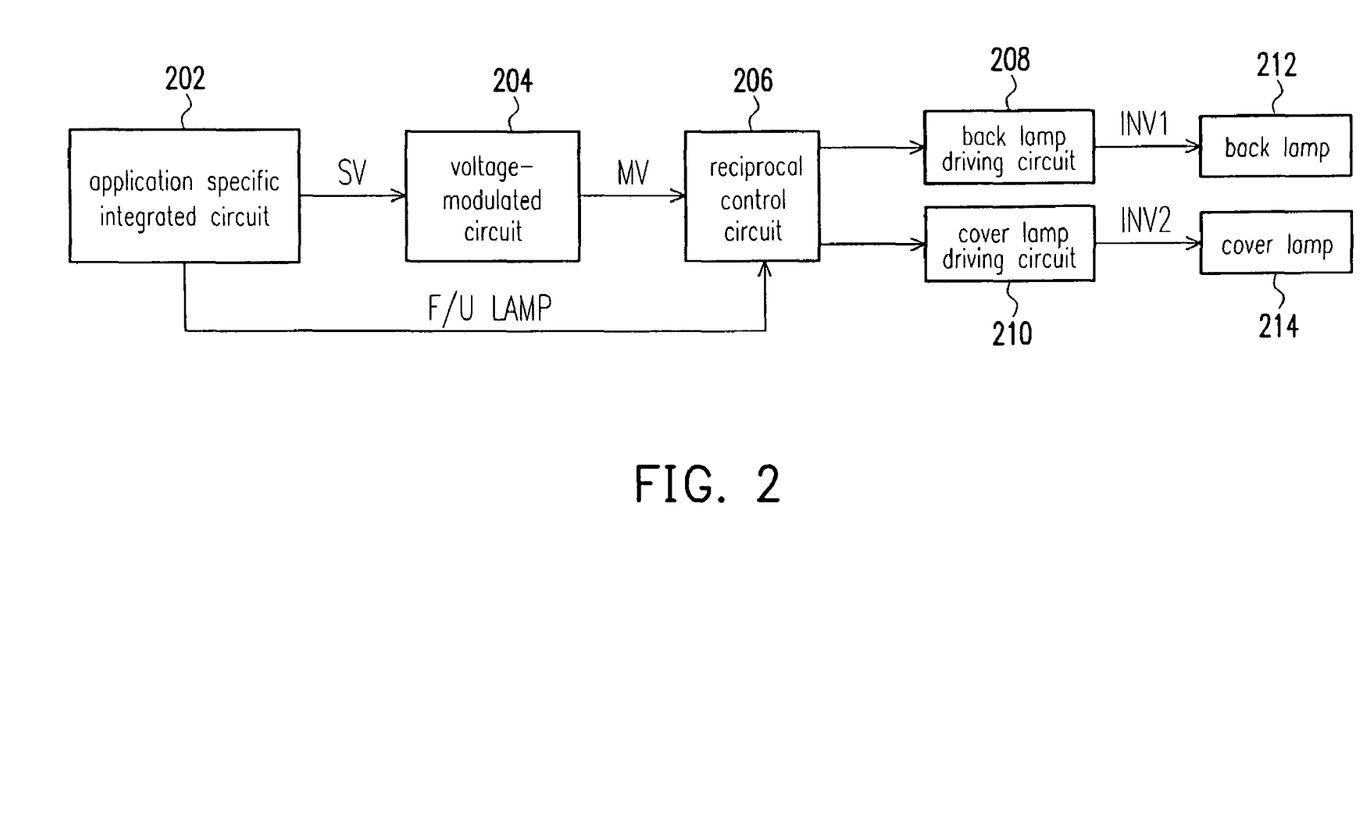
FIG. 2 is a block diagram showing a dual light source voltage-modulated reciprocal control circuit for a scanner according to this invention.

FIG. 2 is a block diagram showing a dual light source voltage-modulated reciprocal control circuit for a scanner according to this invention. As shown in FIG. 2, an application specific integrated circuit 202 outputs a square wave signal SV to a voltage-modulating circuit 204. Pulse width of the square wave signal SV is adjustable. The higher the pulse width of the square wave signal SV, the greater will be the modulated voltage MV having a direct current (dc) profile output from the voltage-modulating circuit 204. Furthermore, the application specific integrated circuit 202 also outputs a reciprocal logic signal F/U LAMP to a reciprocal control circuit 206. The reciprocal logic signal F/U LAMP determines if the modulated voltage MV is sent to a back light driving circuit 208 or a cover light driving circuit 210.

The voltage-modulating circuit 204 outputs the modulated-voltage MV to the reciprocal control circuit 206. The reciprocal control circuit 206 picks up the reciprocal logic signal F/U LAMP from the application specific integrated circuit 202 and sends the modulated voltage MV to the back light driving circuit 208 or the cover light driving circuit 210 respectively. The back light driving circuit 208 and the cover light driving circuit 210 are dc-to-ac inverters capable of converting a direct current (dc) voltage into an alternating (ac) voltage. The back light driving circuit 208 issues an alternating voltage INV1 to a back light 212 and the cover light driving circuit 210 issues an alternating voltage source INV2 to a cover light 214. Hence, either the back light 212 or the cover light 214 is triggered to conduct a document scanning but not both.

Figure 3:
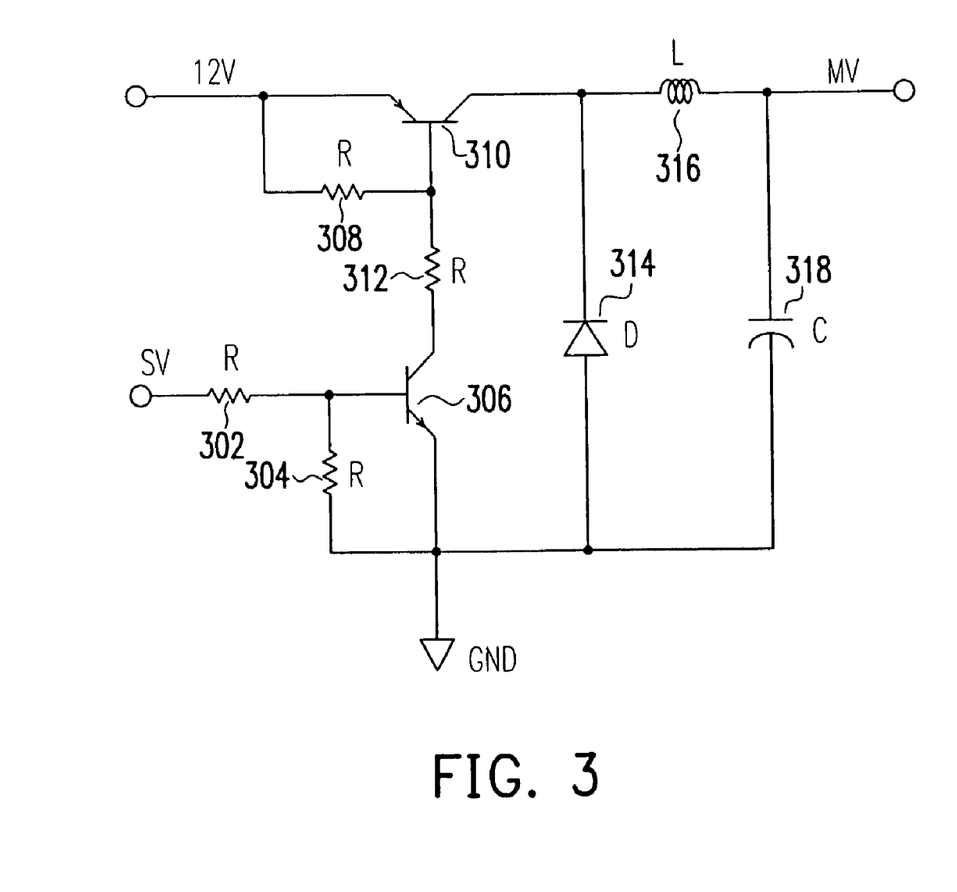
FIG. 3 is a diagram showing a voltage-modulated circuit according to one embodiment of this invention.

FIG. 3 is a diagram showing a voltage-modulated circuit according to one embodiment of this invention. As shown in FIG. 3, a first terminal of a resistor R 302 receives the square wave SV from the application specific integrated circuit 202 (shown in FIG. 2). A first terminal of a resistor R 304 is connected to a second terminal of the resistor R 302 and a second terminal of the resistor R 304 is connected to ground. A first terminal of a resistor R 308 is connected to a voltage source at 12V. A first terminal of a resistor R 312 is connected to a second terminal of the resistor R 308. A voltage source terminal of a transistor 306 is connected to a second terminal of the resistor R 312. A control terminal of the transistor 306 is connected to the second terminal of the resistor R 302. A load terminal of the transistor 306 is connected to ground. A voltage terminal of a transistor 310 is connected to a voltage source at 12V. A control terminal of the transistor 310 is connected to a second terminal of the resistor R 308. The anode of a diode D 314 is connected to ground. A first terminal of an inductor L 316 is connected to the loading terminal of the transistor 310. The second terminal of the inductor L 316 is an output terminal for outputting the modulated voltage MV. A first terminal of a capacitor C 318 is connected to the first terminal of the inductor L 316 and the second terminal of the capacitor C 318 is connected to ground.

In FIG. 3, the resistors R 302, 304, 308, 312 and the transistors 310, 306 together constitute a circuit for boosting voltage. Each of the resistors R 302, 304, 308 and 312 has a different resistance value. The inductor L 316 and the capacitor C 318 serve as energy storage devices and the diode D 314 serves as a circuit bypass.

Figure 4:
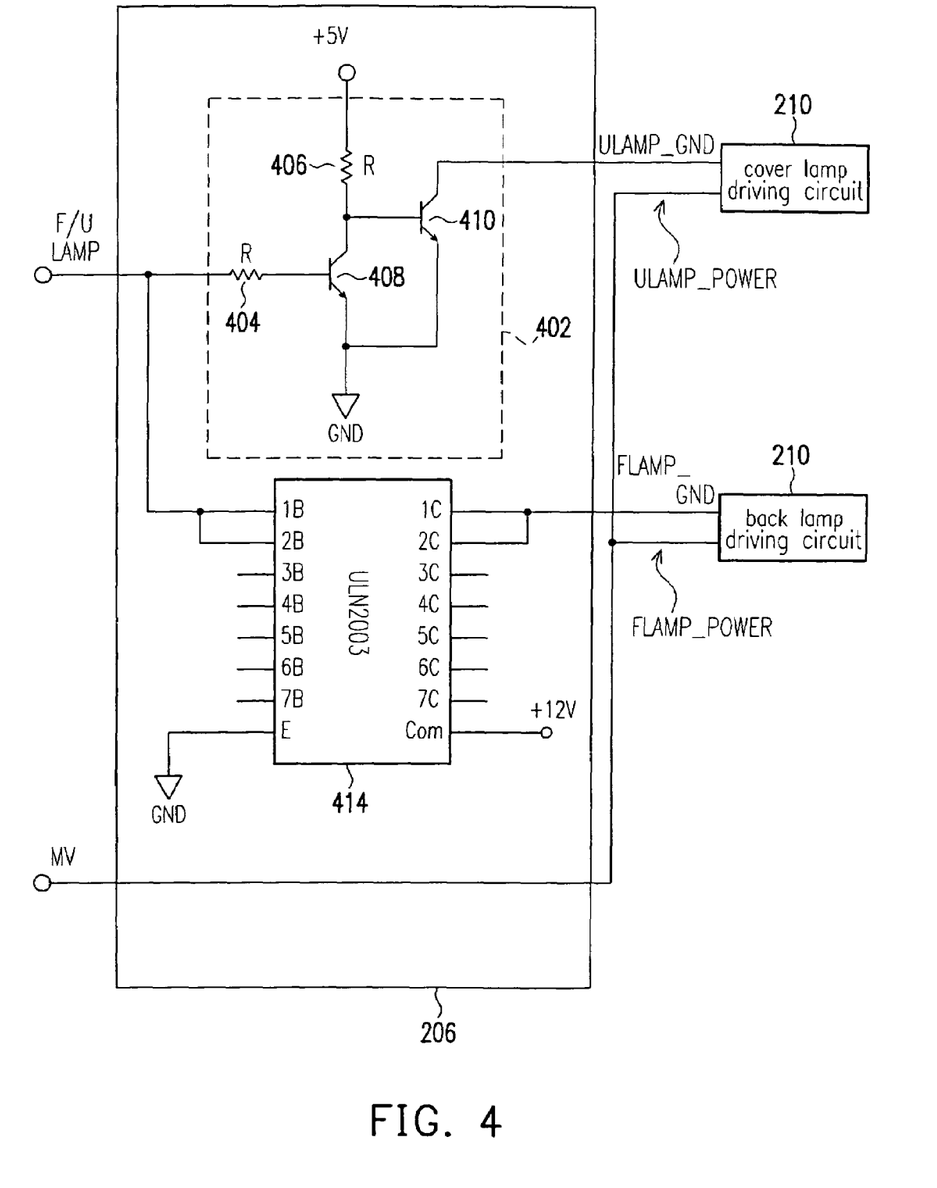
FIG. 4 is a diagram showing a reciprocal control circuit according to one preferred embodiment of this invention.

The reciprocal control circuit 206 (shown in FIG. 2) comprises a common emitter circuit and a Darlington circuit. FIG. 4 is a diagram showing a reciprocal control circuit according to one preferred embodiment of this invention. As shown in FIG. 4, the common emitter circuit 402 includes resistors R 404, R 406 and transistors 408, 410. A first terminal of the resistor R 404 receives the reciprocal logic signal F/U LAMP from the application specific integrated circuit 202. A first terminal of the resistor R 406 is connected to a voltage source at 5V. A source terminal of the transistor 408 is coupled to a second terminal of the resistor R 406. A control terminal of the transistor 408 is coupled to a second terminal of the resistor R 404. A loading terminal of the transistor 408 is connected to ground. A source terminal of the transistor 410 is coupled to a ground terminal ULAMP_GND of the cover lamp driving circuit 210. A control terminal of the transistor 410 is coupled to the second terminal of the resistor R 406. A loading terminal of the transistor 410 is connected to ground. The transistor 410 of the common emitter circuit 402 is designed as a current sink. Hence, current specification of the transistor 410 is especially important.

Input terminals 1B, 2B of the integrated circuit IC ULN2003 414 are connected in parallel to the application specific integrated circuit 202 for receiving the reciprocal logic signal F/U LAMP. Output terminals 1C, 2C are connected in parallel to the earth terminal FLAMP_GND of the back light driving circuit 208. The E terminal of the integrated circuit IC ULN2004 414 is connected to ground. The COM terminal of the integrated circuit IC ULN2004 414 is connected to a voltage source at 12V. After receiving the modulated voltage MV submitted from the application specific integrated circuit 202, the reciprocal control circuit 206 outputs the modulated voltage MV to the source terminal ULAMP_POWER of the cover light driving circuit 210 and the source terminal FLAMP_POWER of the back light driving circuit 208. The resistor R 404 and the resistor R 406 have different resistance values. The integrated circuit IC ULN2003 414 comprises of seven groups of Darlington circuits. The terminals 1B, 2B, 3B, 4B, 5B, 6B, 7B on the integrated circuit IC ULN2003 414 are the input terminals and the terminals 1C, 2C, 3C, 4C, 5C, 6C and 7C on the integrated circuit IC ULN2003 414 are the output terminals of the seven Darlington circuits respectively.

Figure 5:
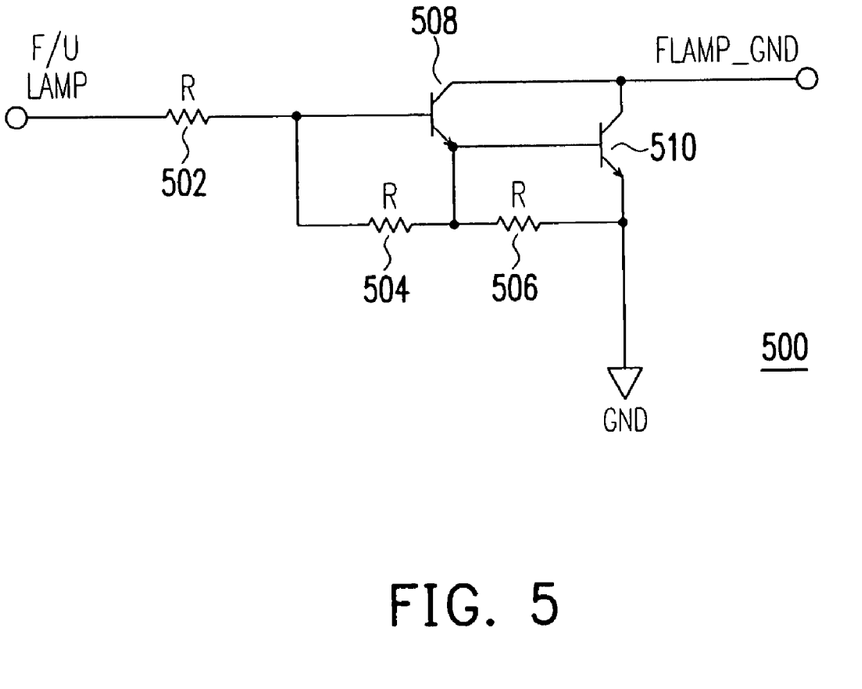
FIG. 5 is a diagram of a Darlington circuit.

FIG. 5 is a diagram of a Darlington circuit. As shown in FIG. 5, the Darlington circuit 500 has a resistor R 502 with a first terminal connected to the application specific integrated circuit 202 for receiving the reciprocal logic signal F/U LAMP. A first terminal of a resistor R 504 is coupled to a second terminal of the resistor R 502. A first terminal of a resistor R 506 is coupled to a second terminal of the resistor R 504. A second terminal of the resistor R 506 is connected to ground. A source terminal of a transistor 508 is connected to the ground terminal FLAMP_GND of the back light driving circuit 208 (refer to FIG. 4). A control terminal of the transistor 508 is coupled to the second terminal of the resistor R 502. A loading terminal of the resistor 508 is coupled to the second terminal of the resistor R 504. A source terminal of a transistor 510 is also coupled to the ground terminal FLAMP_GND of the back light driving circuit 208 20 (refer to FIG. 4). A control terminal of the transistor 510 is coupled to the second terminal of the resistor R 504. A loading terminal of the transistor 510 is connected to ground. Each of the resistors R 502, 504 and 506 has a different resistance value.

Table 1 shows the logic behind the switching of the light sources according to this invention. Refer also to the circuit diagrams shown in FIGS. 4 and 5. When the reciprocal logic signal F/U LAMP output from the application specific integrated circuit 202 (refer to FIG. 2) is HIGH and the pulse width modulated square wave SV is PULSE/HIGH, the transistor 408 is "ON" and hence the transistor 410 is "OFF". An open circuit is formed between the source terminal ULAMP_POWER of the cover light driving circuit 210 and the ground terminal ULAMP_GND. Thus, the cover lamp 214 (refer to FIG. 2) is "OFF". Similarly, when the reciprocal logic signal F/U LAMP output from the application specific integrated circuit 202 (refer to FIG. 2) is HIGH and the pulse width modulated square wave SV is PULSE/HIGH, the transistor 508 and the transistor 510 are "ON". The source terminal FLAMP_POWER of the back o light driving circuit 208 and the ground terminal FLAMP_GND form a conductive path so that the back light driving circuit 208 receives the modulated voltage MV. Thus, the back light lamp 212 (refer to FIG. 2) is "ON".

In like manner, when the reciprocal logic signal F/U LAMP output from the application specific integrated circuit 202 (refer to FIG. 2) is LOW and the pulse width modulated square wave SV is PULSE/HIGH, the transistor 408 is "OFF". The transistor 410 is "ON" so that a conductive path is formed between the source terminal ULAMP_POWER of the cover light driving circuit 210 and the ground terminal ULAMP_GND. The cover lamp driving circuit 210 receives the modulated voltage MV and hence the cover lamp 214

(refer to FIG. 2) is "ON". Similarly, when the reciprocal logic signal F/U LAMP output from the application specific integrated circuit 202 (refer to FIG. 2) is LOW and the pulse width modulated square wave SV is PULSE/HIGH, the transistor 508 and the transistor 510 are both "OFF". An open circuit is formed between the source terminal FLAMP_POWER of the back light driving circuit 208 and the ground terminal FLAMP_GND. Thus, the back light lamp 212 (refer to FIG. 2) is "OFF".

In Table 1, the dual light source voltage-modulated reciprocal control circuit may operate in an energy-saving mode. This occurs when the pulse width modulated square wave SV output from the application specific integrated circuit 202 (refer to FIG. 2) is LOW. Under such voltage setting, the reciprocal logic signal F/U LAMP from the application specific integrated circuit 202 (refer to FIG. 2) is incapable of triggering the back light 212 or the cover light 214.

In summary, when the reciprocal control circuit picks up reciprocal logic signal from the application specific integrated circuit, the reciprocal control circuit will output a reciprocal logic signal that switches on either the back light or the cover light. Hence, one set of voltage-modulating circuit can provide necessary power for driving the back light and the cover light. In addition, the integrated circuit IC ULN2003 414 used in FIG. 4 is one of the components inside the scanner and hence no additional IC is required. Furthermore, comparing the common emitter circuit 402 and the voltage-modulating circuit shown in FIG. 3, the common emitter circuit 402 has a simpler configuration, requires fewer electronic devices and occupies less printed circuit board area.

Since only one set of voltage modulation circuit is required, the circuit demands fewer electronic devices and occupies a smaller printed circuit board area. Hence some hardware cost is saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method, comprising:
    generating a square wave signal and a reciprocal logic signal in a scanner, wherein the scanner comprises:
        a first light source comprising a back lamp configured to illuminate an opaque document; and
        a second light source comprising a cover lamp configured to illuminate a transparent document;
    modulating the square wave signal to generate a modulated voltage in a voltage-modulated circuit;
    transmitting the modulated voltage to a reciprocal control circuit;
    determining a pulse height of the reciprocal logic signal at the reciprocal control circuit; and
    to perform a scanning operation, driving one light source selected from a group consisting of the first light source and the second light source based, at least in part, on the reciprocal logic signal, wherein the first light source is driven when the pulse height is high, and the second light source is driven when the pulse height is low.

2. The method of claim 1, wherein the voltage-modulated circuit generates the modulated voltage for both the first light source and the second light source.

3. The method of claim 1, wherein the first light source is not driven when the pulse height is low, and wherein the second light source is not driven when the pulse height is high.

4. The method of claim 1, wherein said driving the selected light source comprises:
    selecting a light source driving circuit from a group consisting of a first light source driving circuit associated with the first light source and or a second light source driving circuit associated with the second light source based, at least in part, on the reciprocal logic signal; and
    transmitting the modulated voltage to the selected light source driving circuit.

5. The method of claim 4, further comprising:
    determining a pulse height of the square wave signal, wherein the modulated voltage is transmitted to the selected light source driving circuit when the pulse height of the square wave signal is high.

6. The method of claim 1, wherein the reciprocal control circuit comprises a common emitter circuit and a Darlington circuit.

7. The method of claim 1, further comprising:
    converting the modulated voltage into an alternating-current type voltage; and
    driving the selected light source with the alternating-current type voltage.

8. A scanner, comprising:
    means for generating a direct-current type voltage;
    means for identifying a pulse height of a logic signal;
    means for converting the direct-current type voltage into an alternating voltage;
    means for selecting one lamp selected from a group consisting of a first lamp and a second lamp to perform a scanning operation, wherein the means for selecting is configured to select based on the pulse height of the logic signal, and wherein the first lamp comprises a back lamp configured to illuminate an opaque document and the second lamp comprises a cover lamp configured to illuminate a transparent document; and
    means for using a single voltage modulation circuit to drive the selected lamp of the scanner with the alternating voltage.

9. The scanner of claim 8, wherein the means for selecting selects the first lamp when the pulse height is less than a predetermined height and the means for selecting selects the second lamp when the pulse height is greater than the predetermined height.

10. The scanner of claim 9, further comprising:
    means for transmitting the alternating voltage to the selected lamp.

11. The scanner of claim 8, further comprising:
    means for modulating the direct-current type voltage to generate a modulated voltage, wherein the modulated voltage is transmitted to the means for selecting one lamp selected from the group consisting of the first lamp and the second lamp.

12. An article of manufacture comprising a storage medium having stored thereon instructions that, when executed by at least one device, configure the at least one device to:
    generate a square wave signal and a reciprocal logic signal for a scanner, wherein the scanner comprises a first light source and a second light source;
    modulate the square wave signal to generate a modulated voltage;
    perform a scanning operation by transmitting the modulated voltage to one driving circuit selected from a group consisting of a first driving circuit associated with the first light source and a second driving circuit associated with the second light source based, at least in part, on the reciprocal logic signal;

convert the modulated voltage into an alternating-current type voltage; and drive a light source selected from the group consisting of the first light source and the second light source with the selected driving circuit using the alternating-current type voltage.

13. The article of manufacture of claim 12, wherein the voltage is transmitted to both the first driving circuit and the second driving circuit from a common voltage-modulated circuit.

14. The article of manufacture of claim 12, wherein the square wave signal comprises a direct-current type voltage.

15. A scanner, comprising:

a back light for scanning opaque documents;

a cover light for scanning transparent documents; and a dual light source control circuit, wherein the dual light source control circuit comprises:

a first light source driving circuit configured to drive the back light;

a second light source driving circuit configured to drive the cover light;

an application circuit configured to generate a logic signal; and a control circuit configured to drive one light source driving circuit selected from the group consisting of the first light source driving circuit and the second light source driving circuit to perform a scanning operation in response to the logic signal, wherein the first light source driving circuit is configured to convert a modulated voltage into an alternating-current type voltage and to drive the back light with the alternating-current type voltage, and wherein the second light source driving circuit is configured to convert a modulated voltage into an alternating-current type voltage and to drive the cover light with the alternating-current type voltage.

16. The scanner of claim 15, wherein the control circuit is further configured to drive the first light source driving circuit and to not drive the second light source driving circuit when the logic signal is high, and wherein the control circuit is further configured to drive the second light source driving circuit and to not drive the first light source driving circuit when the logic signal is low.

17. The scanner of claim 15, wherein the control circuit comprises a common emitter circuit and a Darlington circuit.

* * * * *

UNITED STATES PATENT AND TRADEMARK OFFICE
CERTIFICATE OF CORRECTION

| | | |
|---|---|---|
| PATENT NO. | : 7,581,679 B2 | Page 1 of 1 |
| APPLICATION NO. | : 11/446178 | |
| DATED | : September 1, 2009 | |
| INVENTOR(S) | : Chang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 339 days.

At column 6, line 9, please replace "and or a second" with --and a second--.
At column 6, line 45, please replace "predetermined height" with --predetermined height,--.
At column 7, line 12, please replace "voltage is" with --modulated voltage is--.

Signed and Sealed this

Twenty-sixth Day of October, 2010

David J. Kappos
*Director of the United States Patent and Trademark Office*